B. F. FAUNCE.
MACHINE FOR CUTTING BLOOMS.
APPLICATION FILED JUNE 11, 1919.
1,372,127.
Patented Mar. 22, 1921.
2 SHEETS—SHEET 1.
Fig. 1,
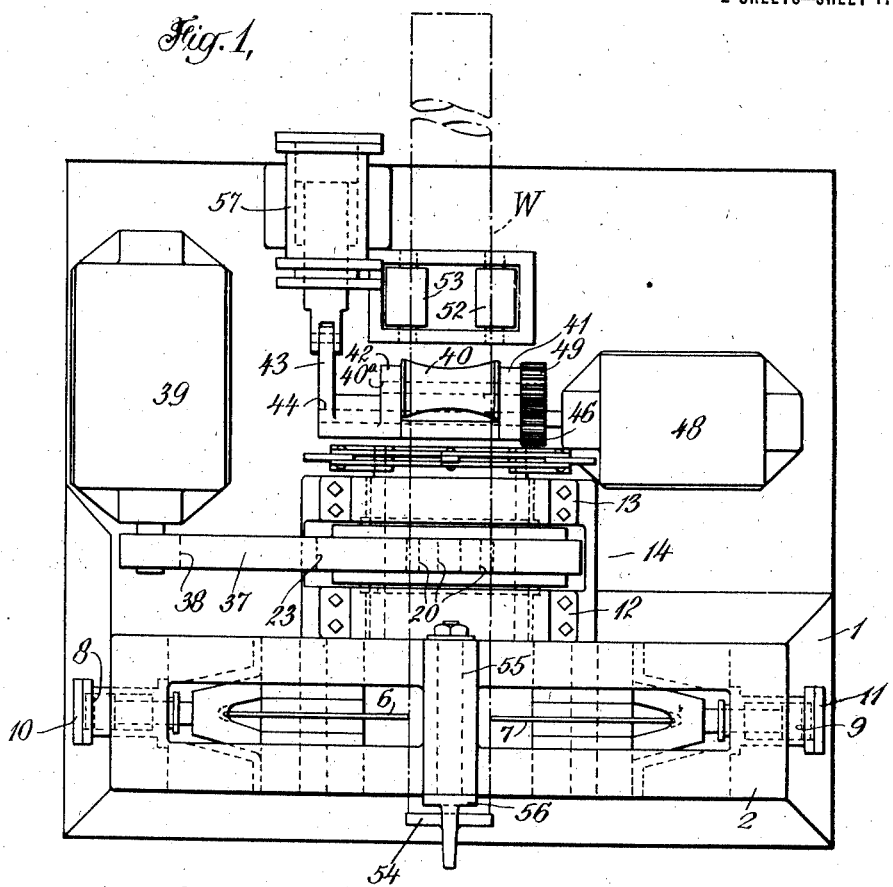
Fig. 2
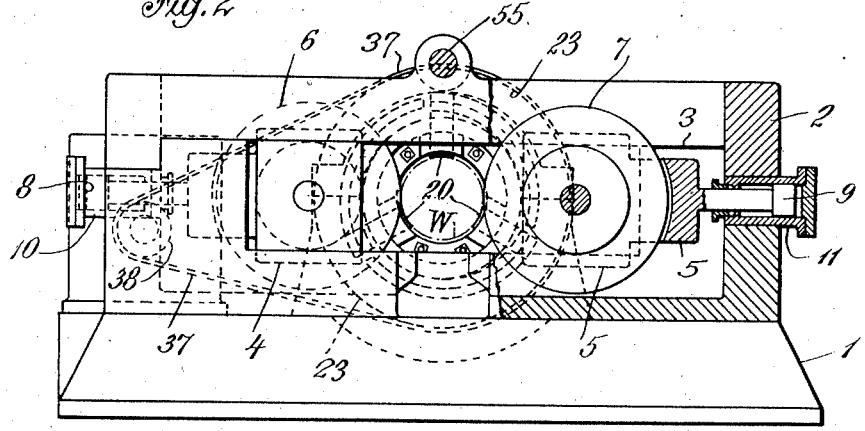
INVENTOR
B. F. Faunce
BY D. Anthony Usina
ATTORNEY B. F. FAUNCE.
MACHINE FOR CUTTING BLOOMS.
APPLICATION FILED JUNE 11, 1919.
1,372,127.
Patented Mar. 22, 1921.
2 SHEETS—SHEET 2.
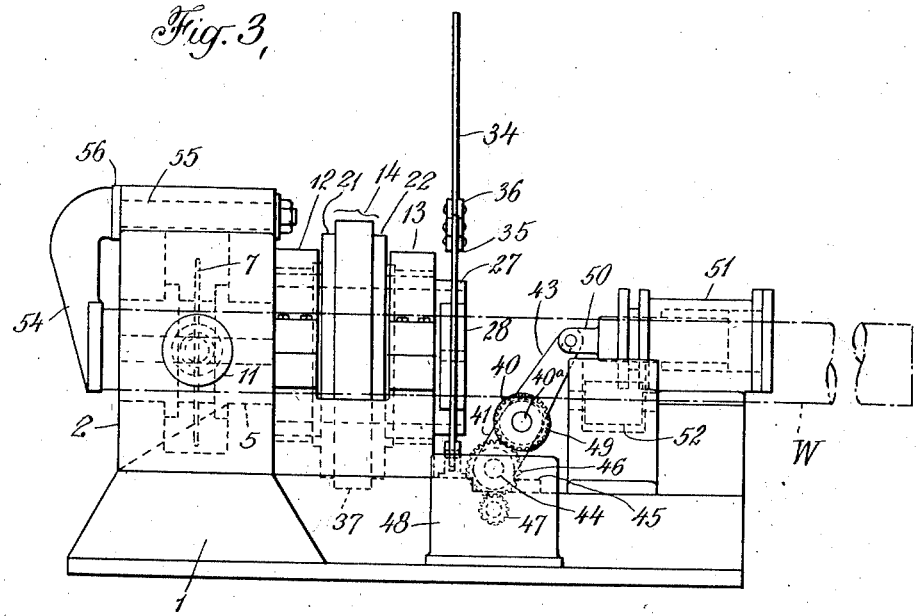
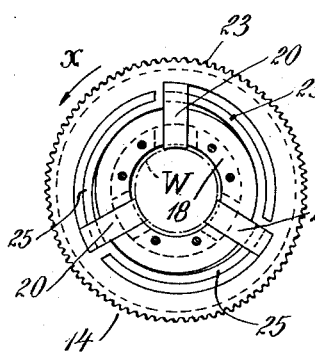
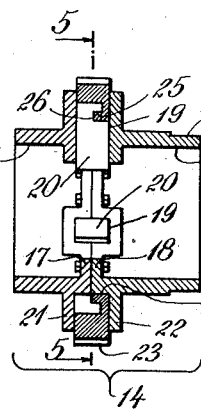
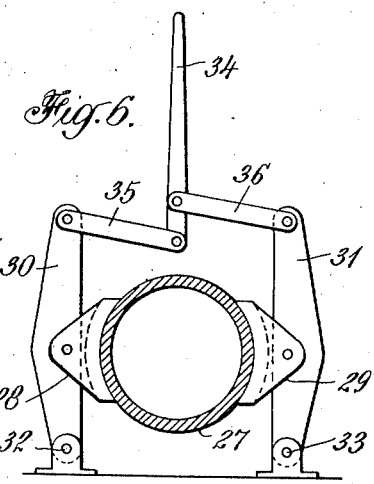
INVENTOR
B. F. Faunce
BY
D. Anthony Usina
ATTORNEY

UNITED STATES PATENT OFFICE.

BENJAMIN F. FAUNCE, OF WILKINSBURG, PENNSYLVANIA.

MACHINE FOR CUTTING BLOOMS.

1,372,127.   Specification of Letters Patent.   Patented Mar. 22, 1921.

Application filed June 11, 1919. Serial No. 303,436.

*To all whom it may concern:*

Be it known that I, BENJAMIN F. FAUNCE, a citizen of the United States, residing in Wilkinsburg, Pennsylvania, have invented certain new and useful Improvements in Machines for Cutting Blooms, of which the following is a specification.

This invention relates to an apparatus for severing the ends of work pieces such as ingots or blooms and the embodiment illustrated consists in a pair of shears adapted to be rotated by frictional engagement with the work being cut. A power driven chuck is provided for positively turning the work and this chuck is so constructed that its gripping jaws can be engaged and disengaged from the work while it is turning. A feeding device is provided for accommodating different diameters of work and is so constructed that it may be adjusted to compensate for the variations in diameter to maintain the axis of the work in line with a plane passing through the centers of the rotary shears.

The objects and advantages of the invention will be clear to those skilled in the art from the following specification and claims when read in the accompanying drawings in which Figure 1 is a plan view showing the general lay-out of the apparatus;

Fig. 2 is an end view thereof with parts shown in section;

Fig. 3 is a side view of the apparatus being viewed from the left of Fig. 2;

Figs. 4 and 5 are detail views of the chuck, Fig. 5 being a view on line 5—5 of Fig. 4;

Fig. 6 is a detail view illustrating a braking device for effecting a relative movement between two members of the chuck to cause the gripping jaws thereof to be either engaged or disengaged.

Referring to Figs. 1 to 3 the apparatus is supported on a bed 1 having an upstanding frame 2 formed on one end thereof and in which guides 3 are provided to slidably support yokes 4 and 5. The yokes 4 and 5 carry rotary shears 6 and 7 and said yokes are adapted to be moved toward and away from each other by means of pistons 8 and 9 operating within cylinders 10 and 11 supported by the frame 2. A pair of pillow blocks 12 and 13 carried by the bed 1 serve to rotatably support the chuck which is indicated generally by the numeral 14. This chuck is constructed of two hollow cylindrical portions 15 and 16 which have inner flanges 17 and 18 by which they are secured together. A plurality of sockets 19 are formed for guiding the gripping jaws 20. On the outer face of members 15 and 16 flanges 21 and 22 are formed for positioning a ring gear 23 which is seated on the cylindrical bearing 24 formed between said flanges. This ring gear has a plurality of upstanding eccentric ribs 25 fashioned thereon and adapted to co-act with complementary notches 26 formed on one side of the gripping jaws 20. In Fig. 4 it will be seen that the right hand portion 16 of the clutch is of greater length than the left hand portion to provide a braking surface 27. A pair of brake shoes 28 and 29 carried by levers 30 and 31 pivoted to suitable brackets 32 and 33 are actuated through hand lever 34 and connecting links 35 and 36 to exert a braking action on the drum 27.

The gear 23 is driven through a silent chain 37 connecting it with a pinion 38 carried by the motor 39 and when the motor rotates the chuck in the direction indicated by the arrow X in Fig. 5, if pressure is applied to the brake drum 27 by manipulating the handle 34 there will be an initial relative movement between the gear 23 and the chuck housing. This relative movement will cause the co-acting ribs 25 and grooves 26 formed respectively in the gear 25 and gripping jaws 20 to move said gripping jaws inwardly to firmly engage the work piece W. After the jaws have gripped the work and started it revolving the pressure may be removed from the brake drum 27 as the driving action of the gear 23 will exert sufficient pressure to hold these jaws in engagement with the work.

For feeding the work longitudinally through the rotary chuck and into position to be acted upon by the rotary shears I provide a dished roller 40 which is mounted for rotation in the arms 41 and 42 of an adjusting lever 43 which is pivoted at 44 to a suitable bracket 45 secured to the bed of the machine. A gear 46 is loosely mounted on the shaft 44 and meshes with a driving gear 47 secured to the armature shaft of a feed motor 48 and with a gear 49 secured to the shaft 40ª of the dished roller 40. The arm 43 is adapted to be moved about the axis of the shaft 44 by means of a piston carried on the end of a piston rod 50 operating within the cylinder 51. As thus constructed it will be clear that work pieces of various diameters may be fed through the chuck 14 in such position that the axes thereof are in true alinement with the axis of said chuck, it being understood that when the size of work is changed it is merely necessary to admit fluid pressure to one side or the other of the cylinder 51 to thereby cause lever 43 to be rocked about its shaft 44 to raise or lower the feed roller 40 as desired. Suitable guide rollers 52 and 53 may be provided to support the work piece in such a manner that it can be easily rotated as is well understood in this art. A gage 54 adapted to be swung about a supporting pin 55 mounted for free movement in the frame 2 affords a convenient means whereby the length of stock to be cut off from the work piece may be readily measured, it being understood that liners 56 of different lengths may be utilized to enable an operator to cut off pieces of stock of varying lengths from the work. When necessary or desirable this gage may be swung up out of the way about its pivot 55 and held in such inoperative position by a latch or any other suitable means.

In operation when it is desired to sever a piece from the end of a bloom or other work piece, motor 48 is first started to drive the feed roller 40 and thereby move the work piece longitudinally through the opening in the chuck 14 until the end of the work strikes the gage 54, it being understood that the cutters 6 and 7 at this time are in their retracted positions and that the lever 43 has been previously adjusted to such a position that the axis of the work coincides substantially with that of the chuck 14. The operator then starts the motor 39 and manipulates the lever 34 to exert a pressure on the brake drum 27 which action causes a relative movement to take place between the chuck housing and the gear 23 and thereby causes the jaws 20 to firmly grip the work by reason of the co-action of the complementary ribs and grooves of the gear 23 and the jaws 20. Fluid pressure is now admitted to the cylinders 8 and 9 causing the yokes 4 and 5 to move the shears 7 and 8 into engagement with the work piece and the frictional engagement therewith causes said shears to rotate in unison therewith. Pressure is exerted on the yokes 4 and 5 for a sufficient length of time to sever the work piece whereupon fluid pressure is introduced to the opposite sides of the cylinders 8 and 9 to retract the rotary shears. The motor 39 is now reversed and pressure is exerted on the brake drum 27 by means of the handle 34 and its associated connections to cause a relative movement between the housing of the chuck 14 and the gear 23 in the opposite direction to that previously described to effect a withdrawal of the gripping jaws 20. The motor 48 is again operated for a short period of time to cause the roller 40 to again feed the work W into position to be operated upon as previously described.

While I have described with great particularity of detail a specific embodiment of the invention herein shown it is not to be interpreted that I am limited thereto as changes in construction and substitution of equivalents may be made without departing from the scope of the invention as defined in the following claims.

What I claim is—

1. In an apparatus of the class described, a pair of rotary shears adapted to be driven by frictional engagement with the work, sliding yokes for supporting said shears, fluid pressure cylinders having their pistons connected to said yokes for moving said yokes to keep said shears in cutting engagement with the work piece, a chuck for positively rotating the work piece, a motor for driving said chuck, and means whereby said chuck can be engaged on the work piece when the motor is driving said chuck in one direction and disengaged from the work piece when the motor is driving said chuck in the reverse direction.

2. In an apparatus of the class described, a pair of disk shaped knives for cutting the work piece, a chuck for rotating said work piece during the cutting operation, said chuck comprising two hollow cylindrical sections secured together, said sections having a plurality of guide sockets formed therein, gripping jaws provided with notches slidably mounted in said sockets, a ring gear mounted on the outer periphery of said chuck, having eccentric ribs thereon adapted to engage within said notches in said gripping jaws, means for rotating said ring gear, and means for causing a relative movement between said cylindrical sections and said ring gear to thereby adjust said gripping jaws.

3. In an apparatus of the class described, a pair of disk shaped knives for cutting the work piece, a chuck for rotating said work piece, said chuck comprising a hollow cylindrical member having a plurality of guide sockets therein, gripping jaws slidably mounted in said sockets, means for rotating said chuck, means for adjusting said jaws, and means for frictionally engaging said hollow cylindrical member to hold said member stationary while said jaws are being adjusted.

4. In an apparatus of the class described, a pair of opposing disk shaped knives for cutting the work piece, a chuck for rotating said work piece, said chuck comprising a hollow cylindrical member having a plurality of guide sockets therein, radially extending gripping jaws slidably mounted in said sockets, a braking surface formed on said cylindrical member, means for rotating said chuck, means for adjusting said jaws, a pair of brake shoes adapted to engage said braking surface to hold said cylindrical member stationary while said jaws are being adjusted.

5. In an apparatus of the class described, a pair of disk shaped knives for cutting the work piece, a chuck for rotating said work piece during the cutting operation, said chuck comprising two hollow cylindrical members having inwardly projecting flanges by which they are secured together, and having recesses in their abutting faces forming guide sockets, gripping jaws mounted in said guide sockets, outwardly projecting flanges formed on said cylindrical members, a ring gear mounted between said last named flanges, a plurality of eccentric ribs formed on said ring gear, and adapted to coact with complementary notches formed in said gripping jaws to move said jaws toward or away from said work when said gear is rotated, a braking surface formed on one of said cylindrical members, and a braking device adapted to grip said braking surface, causing said ring gear to move relative to said cylindrical members.

6. In an apparatus of the class described, a pair of disk shaped knives for cutting the work piece, a chuck for rotating said work piece during the cutting operation, said chuck comprising two hollow cylindrical members 15 and 16, having inwardly projecting flanges 17 and 18, respectively, by which they are secured together and having recesses in their abutting faces forming sockets 19, gripping jaws 20, slidably mounted in said recesses, outwardly projecting flanges 21 and 22 formed integral with said cylindrical members, a ring gear 23 positioned between said last named flanges, a plurality of eccentric ribs 25 formed on said ring gear and adapted to coact with complementary notches 26 formed in said gripping jaws, a braking surface 27 formed on one of said cylindrical members, and brake shoes 28 and 29 connected to levers 30 and 31 and operated by hand lever 34, adapted to engage said braking surface, thereby holding said cylindrical members stationary while said ring gear rotates relative thereto, to adjust said gripping jaws.

7. In an apparatus of the class described, a pair of rotary shears adapted to be driven by frictional engagement with the work, sliding yokes for supporting said shears, fluid pressure cylinders having their pistons connected to said yokes for moving said yokes to keep said shears in cutting engagement with the work piece, a chuck for positively rotating the work piece, an axially horizontal vertically adjustable feed roller, said feed roller having a lengthwise curved periphery and being adapted to support and maintain the work substantially in axial alinement with said chuck, fluid pressure means for adjusting said roller, a motor for driving said chuck, and means whereby said chuck can be engaged on the work piece when the motor is driving said chuck in one direction and disengaged from the work piece when the motor is driving said chuck in the reverse direction.

In witness whereof I have hereunto signed my name.

BENJAMIN F. FAUNCE.